United States Patent [19]
Hanks et al.

[11] 3,857,301
[45] Dec. 31, 1974

[54] SPEED REDUCER

[75] Inventors: Jack G. Hanks, Bethel Park; Mohammed A. El Taher, Gettysburg; Eugene H. Seidling, Monroeville; James R. Farley, Pittsburgh, all of Pa.

[73] Assignee: Westinghouse Electric Corporation, Pittsburgh, Pa.

[22] Filed: Mar. 1, 1973

[21] Appl. No.: 337,240

[52] U.S. Cl. .................. 74/665 GE, 74/674, 74/417
[51] Int. Cl. ............................................ F16h 37/06
[58] Field of Search ............ 74/801, 799, 665, 417, 74/688, 674, 665 GE

[56] References Cited
UNITED STATES PATENTS 3,188,886  6/1965  Jandasek .............................. 74/688
3,258,995  7/1966  Bennett et al. ....................... 74/801
3,537,559  11/1970 McNeal, Jr. ......................... 74/801 X
3,650,353  3/1972  Abbott .................................. 74/801 X

*Primary Examiner*—Benjamin W. Wyche
*Assistant Examiner*—Frank H. McKenzie, Jr.
*Attorney, Agent, or Firm*—D. R. Lackey; C. L. McHale

[57] ABSTRACT

A right angle speed reducer having an input shaft, a tubular intermediate shaft, and an output shaft all journaled in bearings for rotation relative to a housing. The output shaft is disposed through the opening of the intermediate shaft. Reduction gearing couples the input and intermediate shafts, and the intermediate and output shafts. Each end of the output shaft is adapted to drive an external device.

14 Claims, 2 Drawing Figures

SPEED REDUCER

BACKGROUND OF THE INVENTION

1. Field of the Invention

The invention relates in general to speed changers, and more specifically to right angle speed reducers.

2. Description of the Prior Art

U.S. Pat. No. 3,677,388, which is assigned to the same assignee as the present application, discloses a new and improved conveyor of the endless belt type, such as a moving stairway or a moving walk. A moving stairway or a moving walk constructed to follow the teachings of this patent will use an endless belt which carries a plurality of teeth along first and second spaced rows parallel to the direction of movement of the endless belt. First and second drive couplings, each including a driven sprocket wheel, an idler sprocket wheel, and a drive chain, are arranged such that the drive chain engages the teeth of its associated sprocket wheels, and teeth of the first and second rows of teeth, respectively, associated with the endless belt. Motive or drive means is mounted within the loop of the endless belt, between the first and second drive couplings, which drives a pair of axially aligned sprocket wheels.

The hereinbefore-mentioned U.S. patent discloses a drive for the drive couplings which includes a parallel shaft, helical gear reducer driven by an induction motor via a timing belt. While this arrangement provides a very satisfactory drive for the driven sprocket wheels of the two drive couplings, it would be desirable to provide a new and improved drive for the sprocket wheels which is direct coupled with the prime mover, simplifying the mounting of the drive unit within the loop of the endless belt. Further, the new and improved drive unit should provide a very low operating noise level, it should be easy to adjust or index the driven sprocket wheels to obtain equal load sharing between the two drive couplings, it should be compact, taking up as little space as possible within the loop of the endless belt, and it should be easy to couple and uncouple the drive unit and the drive couplings.

SUMMARY OF THE INVENTION

Briefly, the present invention is a new and improved direct coupled right angle speed reducer, which may be used in the conveyor application set forth in the hereinbefore-mentioned U.S. patent, and in other drive applications requiring a high efficiency, low noise, compact speed reducer. The speed reducer includes an input shaft, a tubular intermediate shaft, and an output shaft, all journaled in bearings for rotation relative to a housing which serves as the lubricant well for the bearings and other moving parts of the gear box. The drive unit is made compact by disposing the output shaft coaxially within the intermediate shaft, allowing opposite ends of the drive shaft to each drive an external device, such as a sprocket wheel. The diameter of the output shaft is substantially reduced, which thus reduces the outside diameter of the intermediate shaft, by providing trunnions or tubular support members attached to the housing for supporting the driven sprocket wheels, which resist bending moments and enable the output shaft to operate in pure torque.

First meshing reduction gearing couples the input shaft and the intermediate shaft, and second meshing reduction gearing couples the intermediate shaft and the output shaft. The first reduction gearing preferably includes a spiral bevel pinion and a spiral bevel gear, for low noise on the high speed input side of the reducer, and the second stage of reduction gearing preferably includes helical drive and planetary gears.

The drive motor is directly coupled to the input shaft, eliminating a mounting plate and enabling the housing and motor to be directly bolted to the frame of the conveyor when used in the application disclosed in the U.S. patent. The speed reducer is also easily removed from the conveyor by providing the output shaft with an opening at each end, and splining or keying extension shafts therein which are coupled to the sprocket wheels. The trunnions on which the sprocket wheels are mounted are bolted to the housing of the reducer. Thus, the extension shafts may be uncoupled from the sprocket wheels and backed out of the openings of the output shaft. Unbolting the trunnions from the housing then enables the speed reducer to be lifted clear of the conveyor while the sprockets and trunnions remain to carry the load of the endless conveyor. Certain of the axles of the endless conveyor which hold the pallets or steps may have removable sections, enabling these axles to be indexed until they are directly over the speed reducer which is to be removed, to facilitate removal of the speed reducer.

Manufacturing tolerances are made less critical, as well as equal load sharing of the drive couplings facilitated, by providing the means which couples the output shaft with the sprocket wheels with means for indexing or circumferentially moving the sprocket wheels relative to the output shaft, and thus relative to one another. Keying or splining the output shaft extension to fit the output shaft openings in only one circumferential position provides a rough adjustment, with a fine or vernier adjustment being obtained by means which enables the sprocket wheels to be adjustably indexed before firmly securing the sprocket wheels to the output shaft extensions.

BRIEF DESCRIPTION OF THE DRAWINGS

The invention may be better understood and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
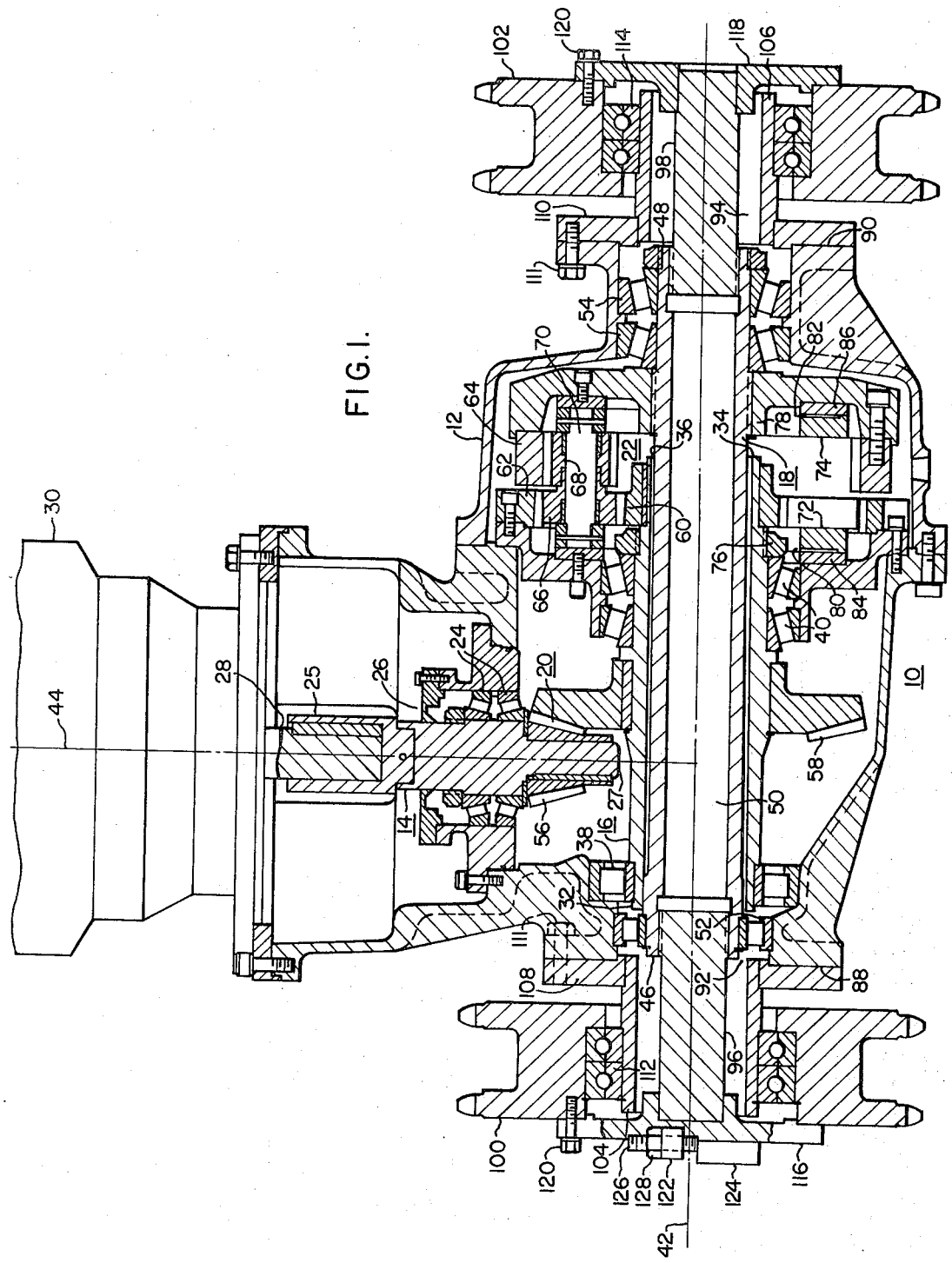
FIG. 1 is a view, partially in section, of a speed reducer constructed according to the teachings of the invention.
Figure 2:
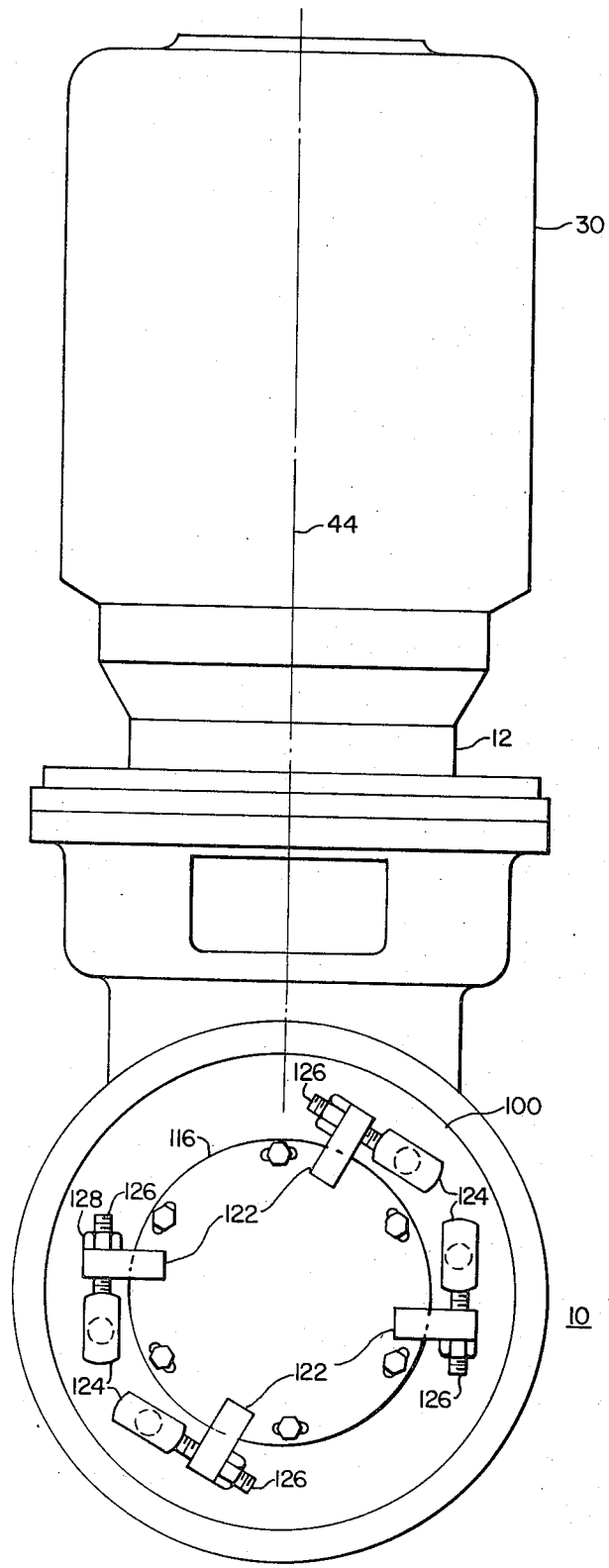
FIG. 2 is a side view of the speed reducer shown in FIG. 1.

Referring now to the drawings, FIGS. 1 and 2 illustrate a new and improved speed reducer 10 constructed according to the teachings of the invention. Speed reducer 10 includes an enclosure or housing 12, a high speed input shaft 14, an intermediate shaft 16, and an output shaft 18. A first stage 20 of meshing reduction gearing couples the input shaft 14 with the intermediate shaft 16, and a second stage 22 of meshing reduction gearing couples the intermediate shaft 16 with the output shaft 18.

The input shaft 14, which has first and second ends 25 and 27, respectively, is journaled in a pair 24 of tapered roller bearings. The first end 25 of the input shaft 14 extends outside housing 12 through a sealed opening 26 therein, and is directly keyed to the output shaft 28 of a drive motor 30. Drive motor 30 may be a standard induction motor.

The intermediate shaft 16 is tubular in construction, having first and second ends 32 and 34, respectively, and an opening 36 having a predetermined inside diameter, with the opening 36 extending between its ends. The intermediate shaft 16 has end 32 journaled in an expansion bearing 38, and end 34 journaled in a pair 40 of tapered roller bearings. Intermediate shaft 16 is preferably mounted such that its longitudinal axis 42 is perpendicular to, and intersects, the longitudinal axis 44 of the input shaft 14. However, certain types of gears, if used in the first stage 20, will require that the axis of the intermediate shaft 16 be offset from, but parallel to, a line which intersects the axis of the input shaft 14.

The output shaft 18 has first and second ends 46 and 48, respectively, and, as illustrated, may be tubular, having an opening 50 extending between its ends. Shaft 18 may also be solid, when used in certain types of applications. When used as the drive for the conveyor disclosed in the hereinbefore-mentioned U.S. patent, however, the intermediate shaft is preferably tubular, or at least have openings extending inwardly for a predetermined dimension from each end thereof, for purposes which will be hereinafter explained.

The output shaft 18 has an outside diameter which is less than the inside diameter of the intermediate shaft 16, and a length dimension which exceeds that of the intermediate shaft. The output shaft 18 is disposed coaxially within the opening of the intermediate shaft 16, with its first and second ends 46 and 48 extending beyond the first and second ends 32 and 34, respectively, of the intermediate shaft 16.

The output shaft 18 is journaled in bearings for rotation relative to the housing 12, such as by expansion bearing 52 disposed adjacent end 46, and by a pair 54 of tapered roller bearings adjacent end 48. Disposing the output shaft inside the opening of the intermediate shaft provides a compact reducer, while enabling both ends of the output shaft to be used for driving external devices, such as the two drive couplings of the conveyor disclosed in the hereinbefore-mentioned U.S. patent.

The first stage 20 of gear reduction, which couples the input and intermediate shafts 14 and 16, respectively, preferably includes a bevel pinion 56 and a bevel gear 58. Either straight or spiral bevel gears may be used, since they are of equal efficiency. However, spiral bevel gears are preferred because of their lower noise level. The bevel pinion 56 is mounted on and keyed to the second end 27 of the input shaft 14, in meshing engagement with the bevel gear 58 which is mounted on and keyed to the intermediate shaft 16. With bevel gears in the first stage 20, the axes of the input and intermediate shafts 14, and 16, respectively, will intersect, which is an advantage when the drive is used with the conveyor application disclosed in the hereinbefore-mentioned U.S. patent. However, it is to be understood that hypoid gears may be used in the first stage 20, in which event the axis of the intermediate shaft 16 will not intersect the axis of the input shaft 14.

The second stage 22 of gear reduction, which couples the intermediate and output shafts 16 and 18, respectively, is planetary gearing, preferably helical planetary gearing. Planetary gearing is used in the second stage for its high efficiency, compactness and vibration-free operation. The planetary gearing includes a sun gear or gear wheel 60, a first internal ring gear or gear wheel 62, a second internal ring gear or gear wheel 64, and planetary gears 66 and 68. Two additional sets of planetary gears similar to planetary gears 66 and 68 are provided, which do not appear in the cross-sectional view of the speed reducer since they are each spaced 120° from the set of planetary gears illustrated. However, since they are of similar construction to the planetary gears 66 and 68, it is not necessary to describe them in detail. Instead of spacing three sets of planetary gears 120° apart, two sets spaced 180° apart may also be used.

More specifically, gear wheel 60 is mounted on and keyed to the intermediate shaft 16. The first internal gear wheel 62 is fixed to the housing 12 such that its teeth are radially spaced from the teeth of the gear wheel 60, and aligned therewith such that planetary gear 66 is in meshing engagement with both gears 60 and 62. Planetary gear 68 is coaxial with planetary gear 66 and fixed thereto such as by cutting both gears from the same piece of metal. The second internal gear wheel 64 is mounted on and keyed or splined to the output shaft 18, and axially located to mesh with the planetary gear 68.

The sets of planetary gears, such as the set which includes planetary gears 66 and 68 are each journaled in bearings for rotation on a shaft, such as shaft 70, on which gears 66 and 68 are mounted. Each set of planetary gears is disposed between first and second spaced washer members 72 and 74, with the ends of their shafts being pinned or otherwise fixed to the washer members 72 and 74. The resulting assembly of washer members 72 and 74 and equally spaced sets of planetary gears disposed therebetween, such as the set which includes planetary gears 66 and 68, is mounted such that it is free to rotate about axis 42. Each set of planetary gears tends to move the washer-planetary gear assembly towards the axis 42. However two or more sets of planetary gears, spaced to offset these inward forces will automatically center the washer-planetary gear assembly. Thus bearings are not required between the inside surfaces of the washer members 72 and 74 and the adjacent nut 76 and projection 78 of the second internal ring gear 64 respectively. Helical planetary gears produce a side thrust or force and thus thrust washer members 84 and 86 are provided to prevent axial movement of the washer-planetary gear assembly. The surfaces of washer members 72 and 74 which are disposed on opposite sides of the planetary gear assembly may have a plurality of circumferentially spaced, radially extending oil grooves therein, such as grooves 80 and 82 in washer members 70 and 74, respectively, and the thrust washer members 84 and 86 may be fixed to the housing 12 and to the second ring gear 64, respectively, such that the grooved surfaces of the washer members 72 and 74 are in lubricated contact with the thrust washer members 84 and 86, respectively.

FIG. 2 illustrates the orientation of the speed reducer 10 when mounted on an inclined conveyor, such as a moving stairway, with the oil level in the lubrication well provided by the housing being indicated thereon. The rotation of gear 58, the planetary gear assembly, and the second ring gear 64, all serve to splash and sling oil out of the oil reservoir for lubrication of bearing points and moving parts located above the oil level.

With the orientation shown in FIG. 2, in which the drive motor 30 and input shaft 14 are on the downhill side of the movable stairway, the bearings 24 and the meshing contact between the gears in the first stage 20 are below the oil level.

Up to this point, a compact, low-noise, right angle speed reducer has been disclosed which, by properly selecting the speed of the drive motor 30, the gear ratio in the first stage 20 of gearing, and the relative diameters of the internal ring gears and the number of teeth on the planetary gears in the second stage 22, will provide the required reduction in speed of the directly driven input shaft 14 to the output shaft 18, both ends of which extend past the ends of a hollow intermediate shaft 16 it is disposed coaxially within. Thus, both ends of the output shaft 18 may be used to drive external devices.

It will be noted in FIG. 1 that the ends 46 and 48 of the output shaft 18 do not extend beyond ends 88 and 90 of housing 12, which ends define openings 92 and 94, respectively, which are coaxial with axis 42 of the intermediate and output shafts 16 and 18, respectively. This construction is specific to an embodiment of the invention which provides advantages when the speed reducer is used with the conveyor disclosed in the hereinbeforementioned U.S. patent, and the speed reducer 10 as used in this application will now be described.

As hereinbefore stated, output shaft 18 is preferably tubular, having an opening 50 extending between its ends, or it at least has openings at each end thereof, when used in the conveyor application disclosed in the U.S. patent. First and second output shaft extension members 96 and 98, respectively, are provided for extending the output shaft 18 beyond ends 88 and 90 of the housing 12. The inside diameter of the output shaft 18 adjacent each of its ends 46 and 48, and the outside diameter of one end of each output shaft extension member 96 and 98 is splined, or otherwise machined to enable the specially prepared end of each output shaft extension member 96 and 98 to be inserted into opening 50 at ends 46 and 48, respectively, of the output shaft 18. The splining or keying of the output shaft extension members 96 and 98 to the output shaft 18 permits them to be axially inserted into the output shaft 18, and to then rotate with the output shaft when the output shaft 18 is driven. While it is preferable to couple the output shaft 18 and its extension members by inserting the extension members into openings in the ends of the output shaft, it will be apparent that the output shaft may be coupled to the extension members by providing openings in the extension members into which the ends of the output shaft are inserted. For purposes which will hereinafter become apparent, the splining or keying is preferably such that the output shaft extension members 96 and 98 will only mate with the inside diameter of the output shaft 18 when they are in a single predetermined circumferential orientation therewith. For example, this orientation may be achieved by omitting one spline.

The means for coupling the output shaft 18 and the extension member should be such that bending moments applied to the extension members will not be transmitted to the output shaft. For example, the splining may be crowned or provided with a curvature that enables the extensions to be rocked slightly without bending the output shaft.

First and second sprocket wheels 100 and 102 are provided, which, along with the associated idler sprocket wheel, support and drive multistrand drive chains which engage the two rows of teeth carried by the endless belt, to move the endless belt about its loop.

Sprocket wheels 100 and 102 are mounted on first and second hollow tubular members or trunnions 104 and 106, respectively. Trunnions 104 and 106 include flange members 108 and 110 respectively, adjacent one end thereof, which flanges are bolted and sealed, or otherwise removably secured to ends 88 and 90 of the housing 12, forming tubular extensions of openings 92 and 94 in the housing 12 which surround the output shaft extensions 96 and 98, respectively. The flange members 108 and 110 associated with the trunnions 104 and 106, are bolted to the housing 12 in the embodiment shown in FIG. 1, using a plurality of circumferentially spaced bolts 111 which extend through openings in the housing into tapped openings in the flange members 108 and 110.

Sprocket wheels 100 and 102 are journaled in bearings 112 and 114, respectively, for rotation on the trunnions 104 and 106, respectively. The trunnions 104 and 106 support the sprocket wheels 100 and 102, as well as absorb bending moments created during the operation of the sprocket wheels in their drive coupling function. Since the output shaft 18 is protected from bending moments by the trunnions 104 and 106 and by the fit between the output shaft and its extension members which permits the extension to be rocked or pivoted slightly, it operates in pure torque, enabling a substantial reduction to be made in the outside diameter of the drive shaft 18, in the order of 3 to 1. This is very important since the output shaft 18 is disposed coaxially within the intermediate shaft 16. The reduction in the output shaft diameter, compared with a reducer in which the output shaft would be subject to bending moments, reduces the size of the output shaft, the size of the intermediate shaft, and the size of the gearing mounted on the intermediate shaft, all culminating in a substantial reduction in the size, weight and manufacturing cost of the speed reducer.

The sprocket wheels 100 and 102 are driven from the outwardly extending ends of the output shaft extension members 96 and 98 by flange member 116 and 118, respectively, which are fixed to the shaft members 96 and 98, such as by welding. The flange members 116 and 118 have a plurality of circumferentially spaced openings therein for receiving mounting bolts 120, and the outer faces of the sprocket wheels are correspondingly tapped to receive the bolts 120. Thus, locating the tapped openings in the sprocket wheels with a predetermined like circumferential relationship to the sprocket teeth on both sprocket wheels, and allowing the output shaft extension members 96 and 98 to be inserted into the openings in the output shaft 18 with a single similar circumferential orientation, will provide a close alignment of the teeth on one sprocket wheel with the teeth on the other sprocket wheel.

The exacting manufacturing tolerances which would normally be necessary to obtain close alignment of the sprocket teeth, and thus substantially equal loading of the drive couplings, as well as the required smooth operation of the associated endless conveyor when it is used to carry people, are not required with the construction disclosed in FIG. 1. Final adjustment of the teeth of one sprocket wheel relative to the output shaft, and thus relative to the teeth of the other sprocket wheel, is provided by an arrangement, best shown in FIG. 2, which permits a small amount of indexing of one or both sprocket wheels before the bolts 120 are tightened. The openings through one or both of the flange members 116 and 118 which receive bolts 120 may be circumferentially slotted, permitting one or both sprocket wheels to be rotated slightly before the bolts 120 are tightened. If a one tooth adjustment is desired, and only one sprocket wheel is to be adjustable, the complete adjustment would have to be incorporated into the adjustable sprocket wheel. If both sprocket wheels are adjustable, the adjustment on each required to obtain a one tooth adjustment would be one half that required when using a single adjustable sprocket wheel.

To obtain the desired vernier movement of one or both of the sprocket wheels, a plurality of tapped block members 122, best shown in FIG. 2, may be fixed to the edge of one or both of the flange members 116 and 118, such that the tapped portion extends past the edge of the flange. A plurality of stop members 124 are fixed to the sides of the sprocket wheels to be made adjustable, adjacent the tapped block members 122, such that stud-bolt members 126 may threadably engage the tapped openings in the block members 122 and contact the adjacent stop member 124. Thus, the stud-bolt members 126 may be advanced against its associated stop member to rotate the associated sprocket wheel. By using feeler gauges, or some other suitable arrangement, both sprocket wheels may be adjusted to obtain equal load sharing, and bolts 120 may then be tightened. Nuts 128 may be disposed on the stud-bolts 126 to secure them in the desired position and prevent turning of the stud-bolts during use.

The construction of the speed reducer shown in FIGS. 1 and 2 facilitates removal of the speed reducer or drive unit from its position within the loop of the endless conveyor disclosed in the hereinbefore-mentioned U.S. patent. To remove the speed reducer, it is only necessary to remove the bolts 120 which couple the sprocket wheels to the output shaft extension members 96 and 98, pull the output shaft extension members 96 and 98 axially outward until they disengage the ends of the output shaft 18, remove the bolts 111 which secure the flanged trunnions 104 and 106 to the housing 12, rock the sprocket wheels 100 and 102 slightly to provide about ⅛ inch clearance between the flanges 108 and 110 of the trunnions and the ends 88 and 90 of the housing 12, respectively, unbolt the housing 12 and motor 30 from the frame of the conveyor, and lift the drive unit out of its operating position. The sprocket wheels and trunnions thus remain in the proper position to support the weight of the endless belt. A new speed reducer may then be placed in operating position and connected to the sprocket wheels by reversing the above-described removal procedure, and the sprocket wheels may then be adjusted to obtain equal load sharing, also as hereinbefore described.

In summary, there has been disclosed a new and improved right angle speed reducer, which is directly coupled to the motive means. The disclosed speed reducer has a highly efficient, compact, and quiet gear box by combining a spiral bevel pinion and bevel gear reduction stage at the high speed input side of the reducer with a helical planetary gear arrangement on the low speed output side. A hollow intermediate shaft arrangement within which the output shaft is disposed contributes to the compactness, along with a trunnion arrangement for supporting driven sprocket wheels, which arrangement isolates the output shaft from bending moments. The output shaft, being subjected to pure torque may thus be reduced substantially in diameter, enabling the concentric intermediate-output shaft arrangement to be successfully applied, without offsetting disadvantages which would otherwise be encountered if a substantially larger diameter output shaft had to be utilized. The housing of the speed reducer provides unity of lubricant, as its cavity provides a single lubricant well from which all bearings and moving parts are lubricated. Finally, the speed reducer is easy to install and adjust, and also to remove, even when mounted within the loop of the endless belt conveyor disclosed in the hereinbefore-mentioned U.S. patent.

We claim as our invention:

1. A speed reducer, comprising:
   a housing,
   an input shaft journaled in bearings for rotation relative to said housing,
   a tubular intermediate shaft journaled in bearings for rotation relative to said housing,
   first meshing gearing means coupling said input and intermediate shafts,
   an output shaft having first and second ends, said output shaft extending through said tubular intermediate shaft and journaled in bearings for rotation relative to said housing,
   second meshing gearing means coupling said intermediate and output shafts,
   said housing including first and second tubular projections coaxial with said output shaft which surround its first and second ends, respectively,
   first and second sprocket wheels journaled in bearings on said first and second tubular projections, respectively,
   and first and second means coupling the first and second ends of the output shaft to said first and second sprocket wheels, respectively, whereby bending moments applied to the sprocket wheels are resisted by said first and second tubular projections.

2. The speed reducer of claim 1 wherein the first meshing gearing means includes a bevel pinion and a bevel gear associated with the input and intermediate shafts, respectively.

3. The speed reducer of claim 2 wherein the bevel pinion and bevel gear are spiral bevel pinion and spiral bevel gears respectively.

4. The speed reducer of claim 1 wherein the second meshing gearing means is a planetary gear arrangement which includes a sun gear fixed to the intermediate shaft, a first ring gear fixed relative to the housing, a second ring gear fixed to the output shaft, a first planetary gear meshing with said sun and first ring gear, and a second planetary gear adapted to rotate with said first planetary gear and mesh with said second ring gear.

5. The speed reducer of claim 4 wherein the planetary gear arrangement is a helical planetary gear arrangement.

6. The speed reducer of claim 1 wherein the first meshing gearing means includes a bevel pinion and a bevel gear associated with the input and intermediate shaft, respectively, and the second meshing gearing means includes a planetary gear arrangement, including a sun gear fixed to the intermediate shaft, a first ring gear fixed relative to the housing, a second ring gear fixed to the output shaft, a first planetary gear meshing with said sun and first ring gear, and a second planetary gear adapted to rotate with said first planetary gear and mesh with said second ring gear.

7. The speed reducer of claim 1 wherein the axis of the input shaft is perpendicular to and intersects the axis of the intermediate and output shafts.

8. The speed reducer of claim 1 including drive means directly coupled to the input shaft.

9. The speed reducer of claim 1 wherein the housing is sealed to provide a closed cavity, and including lubricating means disposed in the cavity for lubricating the bearings in which the input, intermediate and output shafts are journaled, the bearings in which the first and second sprocket wheels are journaled and other moving parts of the speed reducer.

10. The speed reducer of claim 1 wherein the first and second means coupling the first and second ends of the output shaft to the first and second sprocket wheels are first and second shaft members, respectively, with said first and second shaft members forming coaxial extensions of the output shaft.

11. The speed reducer of claim 10 wherein the first and second shaft members and the output shaft include cooperatively shaped adjacent surfaces which enable the first and second shaft members to be advanced axially into engagement with the first and second ends of the output shaft and to rotate with the output shaft when the output shaft is driven.

12. The speed reducer of claim 1 including means for rotatably adjusting at least one of the sprocket wheels relative to the output shaft, to enable the first and second sprockets to equally share load applied thereto.

13. The speed reducer of claim 1 wherein the first and second tubular projections are removably fixed to the housing, and the first and second means coupling the output shaft to the sprocket wheels include first and second output shaft extension members which are removably fixed to the sprocket wheels and to the output shaft, said output shaft extension members being longitudinally movable to disengage the output shaft.

14. A speed reducer, comprising:
a housing,
an input shaft journaled in bearings for rotation relative to said housing,
a tubular intermediate shaft journaled in bearings for rotation relative to said housing,
first meshing gearing means coupling said input and intermediate shafts,
an output shaft having first and second ends, said output shaft extending through said tubular intermediate shaft and journaled in bearings for rotation relative to said housing,
said housing including first and second tubular projections coaxial with said output shaft which surround its first and second ends, respectively,
second meshing gearing means coupling said intermediate and output shafts,
first and second sprocket wheels journaled in bearings on said first and second tubular projections, respectively,
first and second means coupling the first and second ends of the output shaft to said first anad second sprocket wheels, respectively, whereby bending moments applied to the sprocket wheels and resisted by said first and second tubular projections, and
means for rotatably adjusting each sprocket wheel relative to the axis of said output shaft.

* * * * *